(12) United States Patent
Iwashige et al.

(10) Patent No.: US 7,247,958 B2
(45) Date of Patent: Jul. 24, 2007

(54) DYNAMO-ELECTRIC MACHINE

(75) Inventors: Kengo Iwashige, Chiyoda-ku (JP);
Hiroyuki Sato, Chiyoda-ku (JP);
Futoshi Hiyama, Chiyoda-ku (JP);
Takashi Karino, Chiyoda-ku (JP);
Takahiko Sano, Chiyoda-ku (JP);
Kenichi Toorisawa, Chiyoda-ku (JP)

(73) Assignee: Hitachi, Ltd., Tokyo (JP)

( * ) Notice: Subject to any disclaimer, the term of this patent is extended or adjusted under 35 U.S.C. 154(b) by 258 days.

(21) Appl. No.: 10/921,112

(22) Filed: Aug. 19, 2004

(65) Prior Publication Data

US 2005/0135927 A1 Jun. 23, 2005

(30) Foreign Application Priority Data

Dec. 22, 2003 (JP) ............................. 2003-423958

(51) Int. Cl.
*H02K 9/14* (2006.01)
*H02K 9/18* (2006.01)

(52) U.S. Cl. ..................................... 310/58; 310/60 A (58) Field of Classification Search ................. 310/58, 310/254, 64, 258–261, 60 A, 60 R
See application file for complete search history.

(56) References Cited

U.S. PATENT DOCUMENTS

| | | | | |
|---|---|---|---|---|
| 967,240 A | * | 8/1910 | Roberts | 310/260 |
| 3,163,789 A | * | 12/1964 | Rosenberg | 310/53 |
| 3,413,499 A | * | 11/1968 | Barton | 310/58 |
| 3,739,208 A | * | 6/1973 | Shartrand | 310/58 |
| 4,051,400 A | * | 9/1977 | Armor et al. | 310/58 |
| 4,071,790 A | * | 1/1978 | Darby et al. | 310/59 |
| 4,071,791 A | * | 1/1978 | Armor et al. | 310/59 |
| 4,315,173 A | * | 2/1982 | Calfo et al. | 310/53 |
| 4,324,993 A | * | 4/1982 | Sato et al. | 310/58 |
| 4,379,975 A | * | 4/1983 | Kitajima | 310/59 |
| 4,383,191 A | * | 5/1983 | Mizuyama et al. | 310/59 |

(Continued)

FOREIGN PATENT DOCUMENTS

JP 61-161935 7/1986

(Continued)

OTHER PUBLICATIONS

Development of the Evaluation Technique of Rotor Cooling Method of Large Turbine Generator, no date provided/printed on the above document.

*Primary Examiner*—Tran Nguyen
(74) *Attorney, Agent, or Firm*—Crowell & Moring LLP (57) ABSTRACT

The invention prevents a temperature in an end portion of a stator iron core from becoming excessively high due to a heat generated in the end portion of the stator iron core of a turbine generator. In a dynamo-electric machine provided with a stator constituted by a stator iron core, a stator iron core pressing member and a stator coil, a rotor constituted by a rotor iron core, a rotor coil and a holding ring, and a baffle plate arranged in an inner diameter side of an end portion of the stator iron core and distributing a cooling medium cooling an inner side of the machine, the baffle plate is provided for forming a flow of the cooling medium along an inner periphery of the stator iron core pressing member and/or an inner peripheral surface of the end portion of the stator iron core.

5 Claims, 8 Drawing Sheets

U.S. PATENT DOCUMENTS

| | | | |
|---|---|---|---|
| 4,438,542 A | * | 3/1984 | Schuh .................... 360/97.01 |
| 4,609,840 A | * | 9/1986 | Eats et al. .................... 310/58 |
| 4,682,064 A | * | 7/1987 | Crounse et al. ............... 310/61 |
| 5,177,385 A | * | 1/1993 | Cooper et al. ................ 310/53 |

FOREIGN PATENT DOCUMENTS

| | | |
|---|---|---|
| JP | 06-038411 | 2/1994 |
| JP | 11-225455 | 8/1999 |

\* cited by examiner

DYNAMO-ELECTRIC MACHINE

TECHNICAL FIELD

The present invention relates to a dynamo-electric machine, for example, a dynamo-electric machine preferable for effectively cooling a stator end portion of a turbine generator.

BACKGROUND ART

Figure 3:
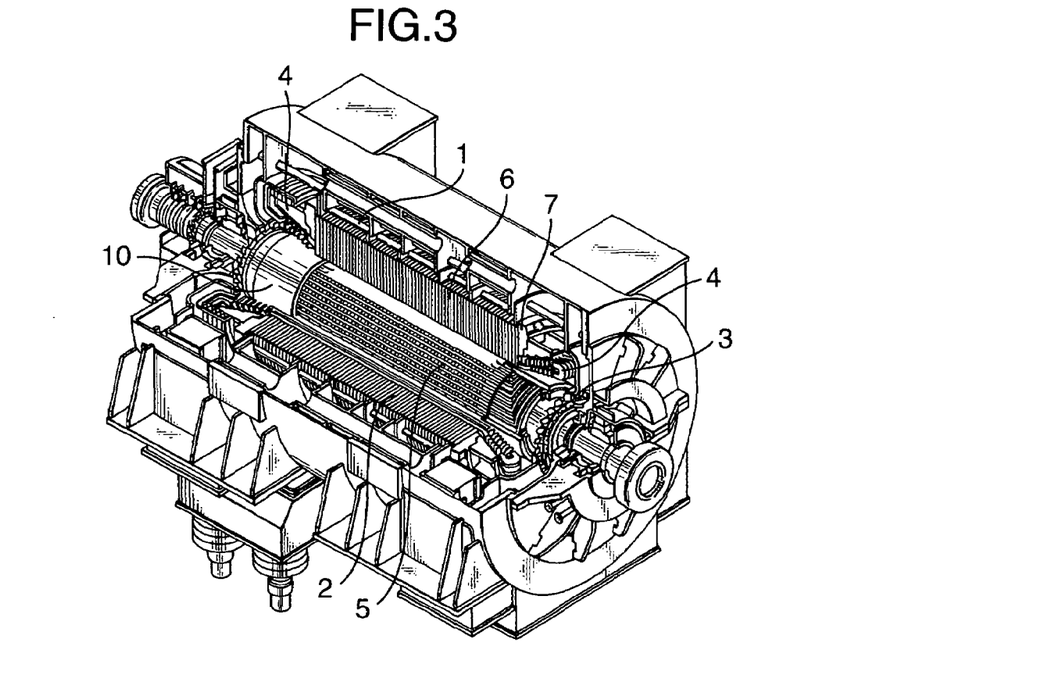
FIG. 3 is a view of an entire structure of a turbine generator corresponding to a subject of the present invention.
Figure 4:
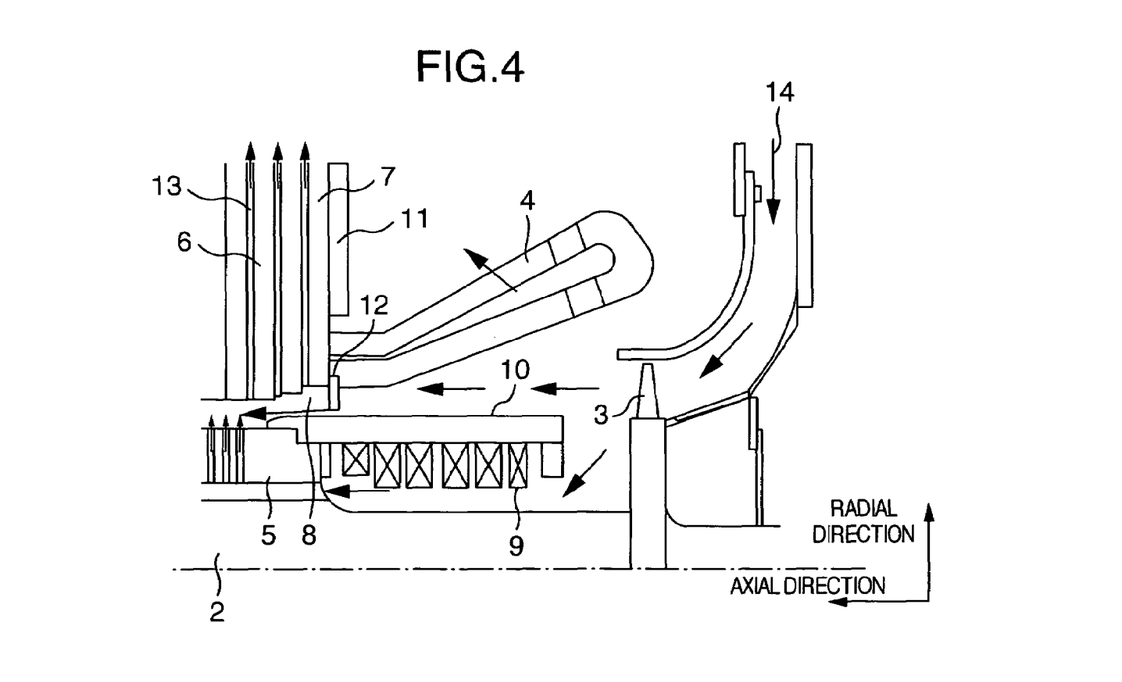
FIG. 4 is an enlarged view of a cross section in a circumferential direction and a radial direction of a stator end portion and a rotor end portion of the turbine generator in FIG. 3.

In the turbine generator, a stator and a rotor generate heat on the basis of electromagnetic and mechanical factors. As a cooling medium for removing the generated heat, air, hydrogen and the like are used. FIG. 3 shows the entire structure of a turbine generator which uses a cooling medium such as air, hydrogen or the like, and FIG. 4 shows the enlarged view of a cross section in an axial direction and a radial direction near the end portions of a stator and a rotor.

A turbine generator has a stator 1 constituted by a stator iron core 6 and a stator coil 4 wound around the stator iron core 6, and a rotor 5 constituted by a rotor iron core 5 arranged in an inner periphery of the stator 1, a rotor coil 9 inserted to a plurality of slots (not shown) provided in the stator iron core 5, and a holding ring 10 covering an outer periphery of an end portion of a rotor coil 9 protruding to an end portion of the rotor iron core 5, and is structured such that the stator 1 and the rotor 2 are arranged via an air gap 8. Further, a stator iron core pressing member 11 for generally pressing the stator iron core 6 is placed in a stator iron core end portion 7, and the stator is fastened and fixed to a stator frame or the like by using the stator iron core pressing member 11.

Figure 5:
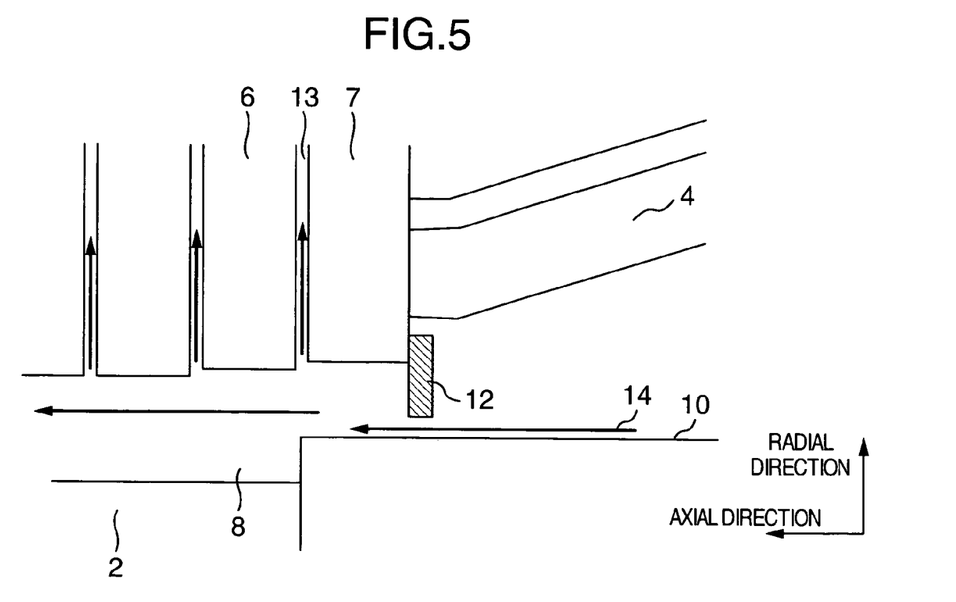
FIG. 5 is an enlarged view of a cross section in an axial direction to a radial direction near end portions of a stator and a rotor using a conventional baffle plate.
Figure 6:
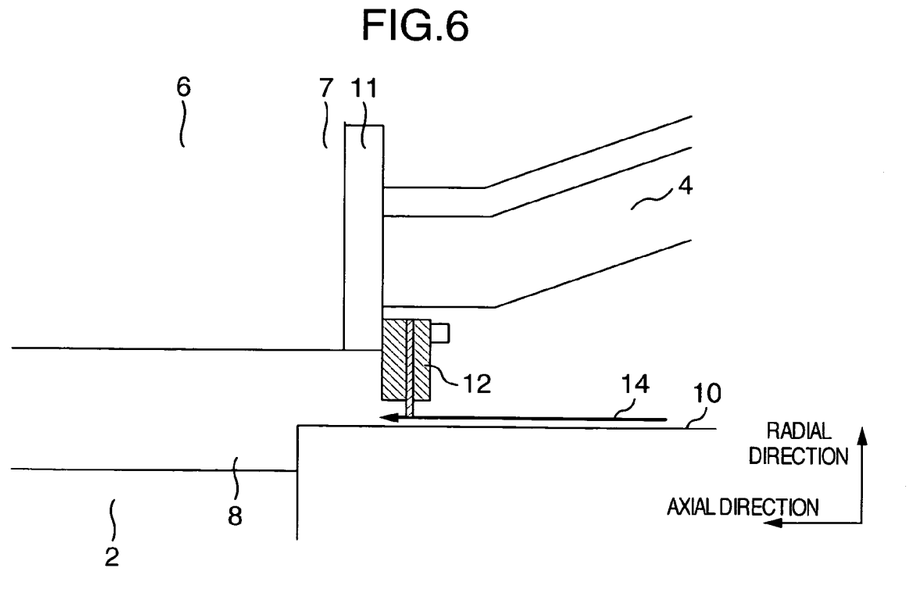
FIG. 6 is an enlarged view of a cross section in an axial direction to a radial direction near end portions of a stator and a rotor using another conventional baffle plate.

Further, as mentioned above, the stator 1 and the rotor 2 generate heat on the basis of electro-magnetic and mechanical factors. However, in order to remove the generated heat and prevent the temperature in the stator 1 and the rotor 2 from becoming excessively high, a blower 3 is provided in the end portion of the rotor 2 or the like, and a cooling medium 14 such as air, hydrogen or the like within the machine is circulated or discharged by using the blower 3. The cooling medium fed from the blower 3 provided in the end portion of the rotor 2 or the like is distributed respectively to a flow path between the stator 1 and the rotor 2, a flow path within the stator 1, a flow path within the rotor 2, and a flow path on a back surface of the stator iron core 6. A flow rate distribution to each of the flow paths is adjusted by partly closing an inlet of the air gap 8 by means of a baffle plate 12 placed in a flow path inlet (an inlet of the air gap 8) between the end portion of the stator 1 and the end portion of the rotor 2, as shown in FIG. 5. The above structure is described in non-patent document 1. In this non-patent document 1, a gap is provided between the baffle plate 12 and the holding 10, and the flow rate to each of the flow paths is distributed by adjusting the gap. Further, the baffle plate structured such that a seal member is sandwiched by two composite rings as shown in FIG. 6 is described in patent document 1, as the same structure.

In this case, in the turbine generator, a leakage flux caused by a field electromotive force and an armature electromotive force complicatedly exists near the stator iron core end portion 7 (refer to patent document 2), and a magnetic flux in an axial direction is incident to an iron core end surface. An eddy current flows through the stator iron core end portion 7 on the basis of the magnetic flux which is incident from the axial direction, and an eddy current loss is generated, so that the stator iron core end portion 7 locally generates heat. In conventional, the heat generation is comparatively small, it is not necessary to control the flow of the cooling medium for removing the heat generation in the baffle plate 12, and the baffle plate 12 is placed for the purpose of distributing the flow rate as mentioned above.

Figure 7:
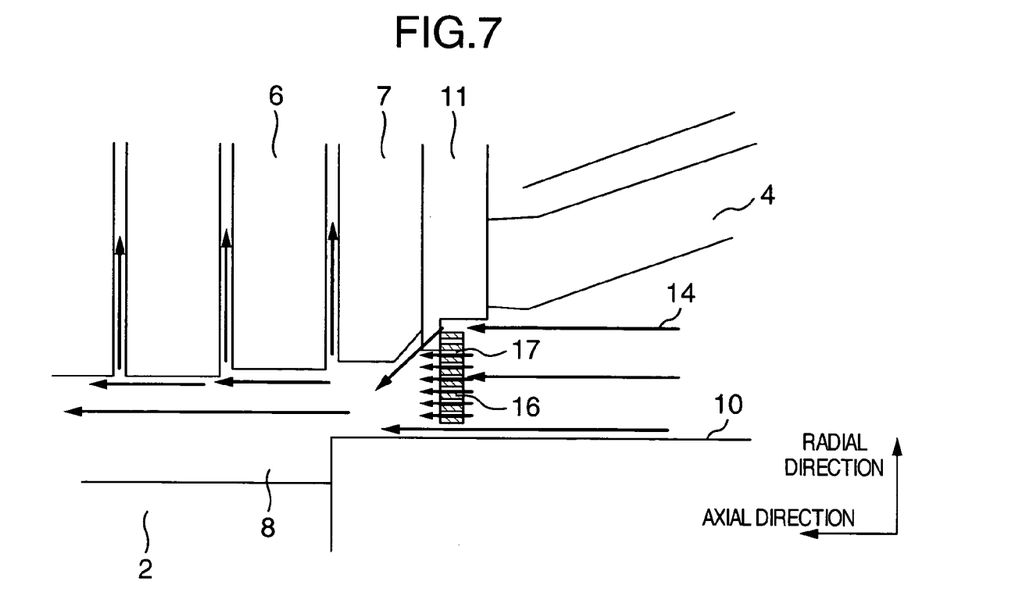
FIG. 7 is an enlarged view of a cross section in an axial direction to a radial direction near end portions of a stator and a rotor using a conventional porous baffle plate.

Further, patent document 3 describes a structure in which a plurality of holes 17 are pierced in an entire of the baffle plate placed in the stator iron core pressing member 11 of the stator iron core end portion 7 so as to form a porous baffle plate 16, thereby adjusting a flow rate distribution of the cooling medium in a downstream side of the porous baffle plate 16 within the air gap. FIG. 7 is an enlarged view of a cross section in an axial direction and a radial direction using the porous baffle plate 16. Since an object of this patent document 3 is to uniformize the flow rate distribution within the air gap and adjust the flow rate distribution to the flow path within the stator iron core 6, the cooling medium passing through the holes 17 in a plurality of porous baffle plates 16 is dispersed to an entire of the flow path between the stator iron core end portion 7 and the rotor iron core 5. Accordingly, there is a problem that a flow speed of the cooling medium in the stator iron core end portion 7 is reduced, and a cooling performance of the stator iron core end portion 7 comes short.

In recent years, it has been required to make the turbine generator to have a small size and a large capacity, and there is a tendency that a heat generation density within the machine becomes higher. Accordingly, in order to prevent the temperature of the stator iron core end portion 7 from becoming excessively high, it has been necessary to effectively cool. As mentioned above, a leakage magnetic flux caused by the field electromotive force and the armature electromotive force complicatedly exists near the stator iron core end portion 7, and the magnetic flux in the axial direction is incident to the iron core end surface. The eddy current flows through the stator iron core end portion 7 on the basis of the magnetic flux incident from the axial direction, the eddy current loss is generated, and the local heat generation is caused.

Under the circumstance mentioned above, since the prior art does not take the cooling of the stator iron core end portion 7 into sufficient consideration, there is a problem that the stator iron core end portion 7 and the stator iron core pressing member 11 are insufficiently cooled and are overheated.

Patent document 1 JP-A-6-38411
Patent document 2 JP-A-11-225455
Patent document 3 JP-A-61-161935
Non-patent document 1"Development of the evaluation technique of Rotor cooling method of large turbine generator", Yoshihiro Taniyama and three others in Toshiba, May 23, 2003, Material RM-03-25 in Rotating Machine Seminar of Japanese Electro-technical Committee.

DISCLOSURE OF THE INVENTION

The problem to be solved by the invention is that the temperature of the end portion in the stator iron core becomes excessively high due to the heat generated in the end portion of the stator iron core.

In order to effectively cool a stator iron core end portion and prevent the temperature of the stator iron core end portion from becoming excessively high, a main feature of the present invention is to provide a baffle plate which is arranged in an inner diameter side of the stator iron core end portion, and forms a cooling medium flow along an inner periphery of a stator iron core pressing member and/or an inner peripheral surface of the stator iron core end portion.

In accordance with a first aspect of the present invention, there is provided a dynamo-electric machine provided with a stator constituted by a stator iron core, a stator iron core pressing member for pressing the stator iron core, and a stator coil wound around the stator iron core, a rotor constituted by a rotor iron core inserted to an inner periphery of the stator via a gap, a rotor coil inserted to a plurality of slots provided in the rotor iron core, and a holding ring covering an outer periphery of a rotor coil end portion protruding from the rotor iron core end portion, and a baffle plate arranged in an inner diameter side of the stator iron core end portion and distributing a cooling medium cooling an inner side of the machine, wherein a gap flowing the cooling medium is provided between the baffle plate and an inner periphery of the stator iron core pressing member and/or between the baffle plate and an inner periphery of the stator iron core end portion, the baffle plate is provided with an opening portion generating a cooling medium flow which is combined with the cooling medium flowing through the gap and flows along the inner periphery of the stator iron core pressing member and/or the inner periphery of the stator iron core end portion, and the opening portion is positioned close to a center in a radial direction rather than the inner diameter of the stator iron core of the baffle plate.

In accordance with a second aspect of the present invention, there is provided a dynamo-electric machine as described in the first aspect, wherein the baffle plate is constituted by a plurality of concentric plates, the opening portion is constituted by a gap formed between the plurality of plates, and the baffle plate is held in a space between the stator iron core and the rotor iron core or in a space between the stator iron core and the holding ring, by a supporting member placed in a side of the stator iron core.

In accordance with a third aspect of the present invention, there is provided a dynamo-electric machine as described in the first aspect, wherein the baffle plate is constituted by a plurality of concentric plates, the opening portion is constituted by a gap formed between the plurality of plates, and the baffle plate is fixed to a side of the holding ring or the rotor iron core, and is held in a space between the stator iron core and the rotor iron core or in a space between the stator iron core and the holding ring.

In accordance with a fourth aspect of the present invention, there is provided a dynamo-electric machine as described in the first aspect, wherein the baffle plate is constituted by one plate, the opening portion is constituted by a through hole pierced in the plate, and the baffle plate is held in a space between the stator iron core and the rotor iron core or in a space between the stator iron core and the holding ring, by a supporting member placed in a side of the stator iron core.

In accordance with a fifth aspect of the present invention, there is provided a dynamo-electric machine as described in the first aspect, wherein the baffle plate is constituted by one plate, the opening portion is constituted by a through hole pierced in the plate, and the baffle plate is fixed to a side of the holding ring or the rotor iron core, and is held in a space between the stator iron core and the rotor iron core or in a space between the stator iron core and the holding ring.

In accordance with a sixth aspect of the present invention, there is provided a dynamo-electric machine as described in the first aspect, wherein the baffle plate is separated into a plurality of pieces in a peripheral direction, and the separated baffle plates are connected to each other directly or via a connecting member.

In accordance with a seventh aspect of the present invention, there is provided a dynamo-electric machine provided with a stator constituted by a stator iron core, a stator iron core pressing member for pressing the stator iron core, and a stator coil wound around the stator iron core, a rotor constituted by a rotor iron core inserted to an inner periphery of the stator via a gap, a rotor coil inserted to a plurality of slots provided in the rotor iron core, and a holding ring covering an outer periphery of a rotor coil end portion protruding from the rotor iron core end portion, and a baffle plate arranged in an inner diameter side of the stator iron core end portion and distributing a cooling medium cooling an inner side of the machine, wherein the baffle plate is extended in an axial direction, a first gap flowing the cooling medium is provided between the baffle plate and an inner periphery of the stator iron core pressing member and/or between the baffle plate and an inner periphery of the stator iron core end portion, a second gap is provided between the baffle plate and the holding ring or between the baffle plate and the rotor iron core, and the first gap generates a cooling medium flow which is flows along the inner periphery of the stator iron core pressing member and/or the inner peripheral surface of the stator iron core end portion.

In accordance with an eighth aspect of the present invention, there is provided a dynamo-electric machine as described in the seventh aspect, wherein the first gap is approximately uniform in the flow direction of the cooling medium.

Since a dynamo-electric machine in accordance with the present invention is provided with the baffle plate which is arranged in the inner diameter side of the stator iron core end portion, and forms the cooling medium flow along the inner periphery of the stator iron core pressing member and/or the inner peripheral surface of the stator iron core end portion, it is possible to effectively cool the stator iron core end portion, so that there is an advantage that the temperature of the stator iron core end portion does not become excessively high even in the case that the heat is generated in the stator iron core end portion.

The object of effectively cooling the stator iron core end portion of the dynamo-electric machine is achieved by approximately the same number of parts as those in the conventional one without deteriorating the function of adjusting the flow rate distribution to each of the flow paths in the conventional dynamo-electric machine.

Other objects, features and advantages of the invention will become apparent from the following description of the embodiments of the invention taken in conjunction with the accompanying drawings.

DESCRIPTION OF THE PREFERRED EMBODIMENTS

Embodiment 1

An entire structure of a turbine generator in accordance with an embodiment of a dynamo-electric machine of the present invention is the same as that of FIG. 3, and a description thereof will be omitted.

Figure 1:
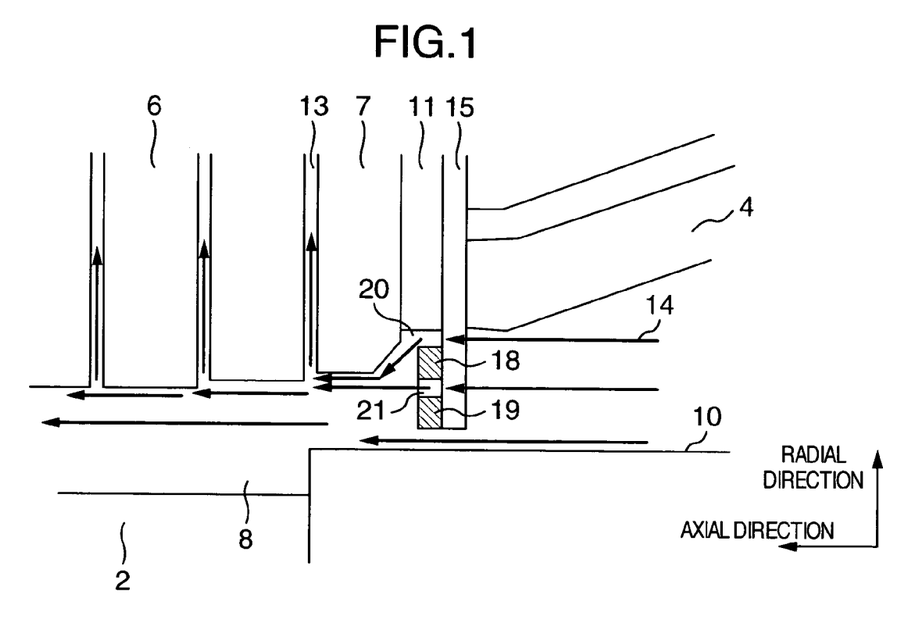
FIG. 1 is an enlarged view of a cross section in an axial direction and a radial direction near end portions of a stator and a rotor in accordance with an embodiment 1 of the present invention.
Figure 2:
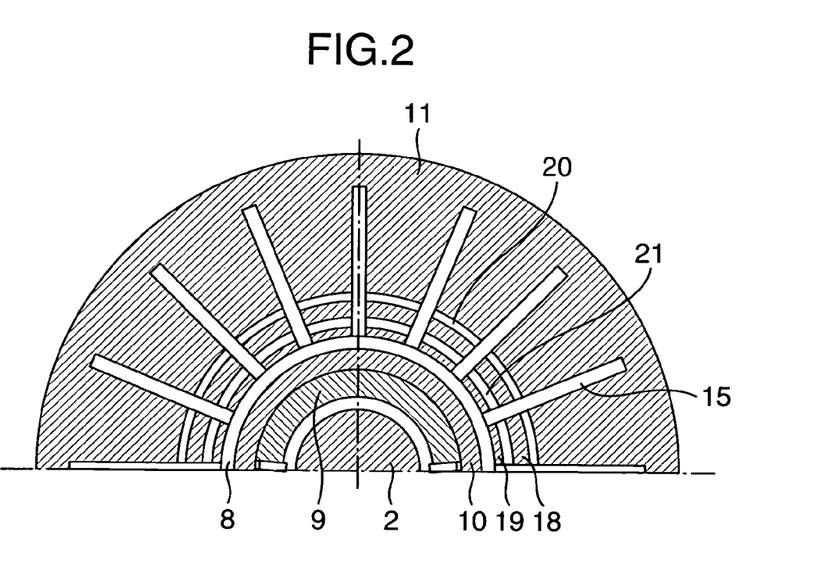
FIG. 2 is a cross sectional view in a circumferential direction and a radial direction near the end portions of the stator and the rotor in accordance with the embodiment 1 of the present invention.

FIG. 1 is an enlarged view of a cross section in an axial direction and a radial direction near end portions of a stator and a rotor showing an embodiment 1 in accordance with the present invention, and FIG. 2 is a cross sectional view in a circumferential direction and a radial direction in a structure shown in FIG. 1.

In the present embodiment, baffle plates 18 and 19 are constituted by two concentric plates, a gap 20 is provided between an inner periphery of a stator iron core pressing member 11 and the baffle plate 18, and between an inner periphery of a stator iron core end portion 7 and the baffle plate 18, and a gap 21 corresponding to an opening portion is provided between the baffle plates 18 and 19. The baffle plates 18 and 19 constituted by two concentric plates are mounted to a baffle plate supporting member 15, and are structured such that the baffle plate supporting member 15 is fixed to the stator iron core pressing member 11, and the gap 20 between the inner periphery of the stator iron core pressing member 11 and the baffle plate 18, and the gap 21 between the baffle plates 18 and 19 are divided by the baffle plate supporting member 15 corresponding to a member in a radial direction.

FIG. 1 corresponds to FIG. 5 showing the structure of the conventional baffle plate. In the structure shown in FIG. 1, a cooling medium 14 from a blower 3 (not shown) also flows between the concentrically arranged baffle plates 18 and 19, and the gap 21 between the baffle plates 18 and 19 is provided at a position close to a center in a radial direction rather than an inner diameter of the stator iron core 6.

In accordance with the present embodiment, the cooling medium flowing through the gap 20 between the inner peripheries of the stator iron core pressing member 11 and the stator iron core end portion 7 and the baffle plate 18 cools the stator iron core pressing member 11 and the stator iron core end portion 7. Further, thereafter, the cooling medium passing through the gap 20 is deflected to the inner diameter side of the air gap 8 along the shape of the stator iron core end portion with respect to a flow direction, however, is collided with the cooling medium passing through the gap 21 between the baffle plate 18 and the baffle plate 19 and injecting in an axial direction, thereby being changed in the direction and being combined so as to form a flow along the inner periphery of the stator iron core 6, so that it is possible to effectively cool the stator iron core 6 and the end portion 7.

Figure 8:
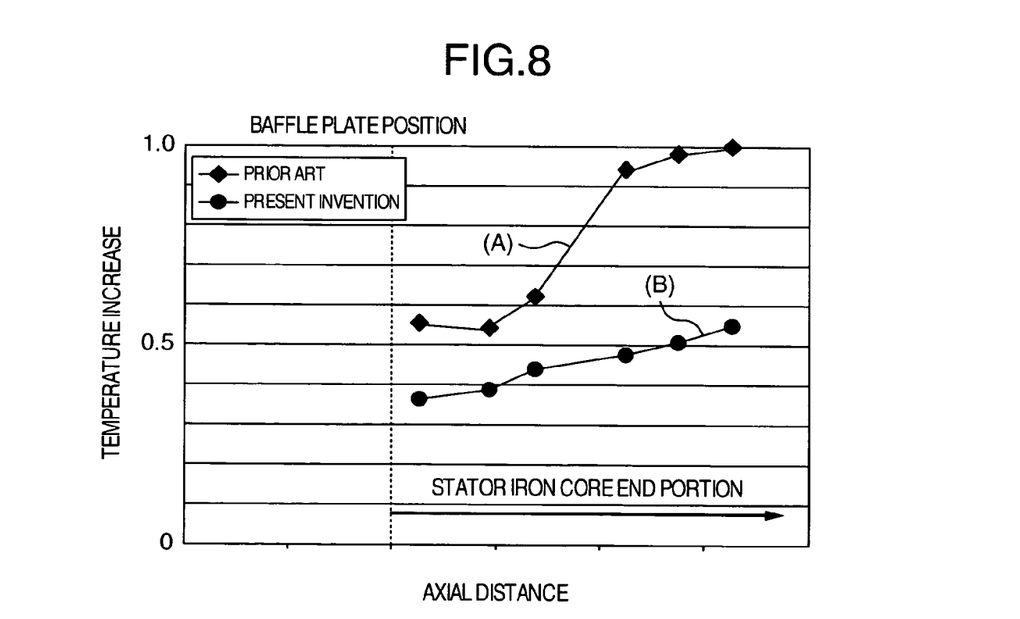
FIG. 8 is a property view showing an effect of the embodiment 1 in accordance with the present invention in comparison with the prior art.

FIG. 8 shows a result obtained by evaluating the effect of the present embodiment in accordance with experiments. A horizontal axis expresses a nondimensional distance in an axial direction starting from the baffle plate, and a vertical axis expresses a nondimensional temperature increase on the basis of a highest temperature in the inner peripheral side of the stator iron core end portion in the prior art. As shown in FIG. 8, in comparison with the prior art (A), the present embodiment (B) can lower the highest temperature increase in the inner periphery of the end portion of the stator iron core at about 50%. Accordingly, it can be understood that the present embodiment is excellent in comparison with the prior art.

Embodiment 2

Figure 9:
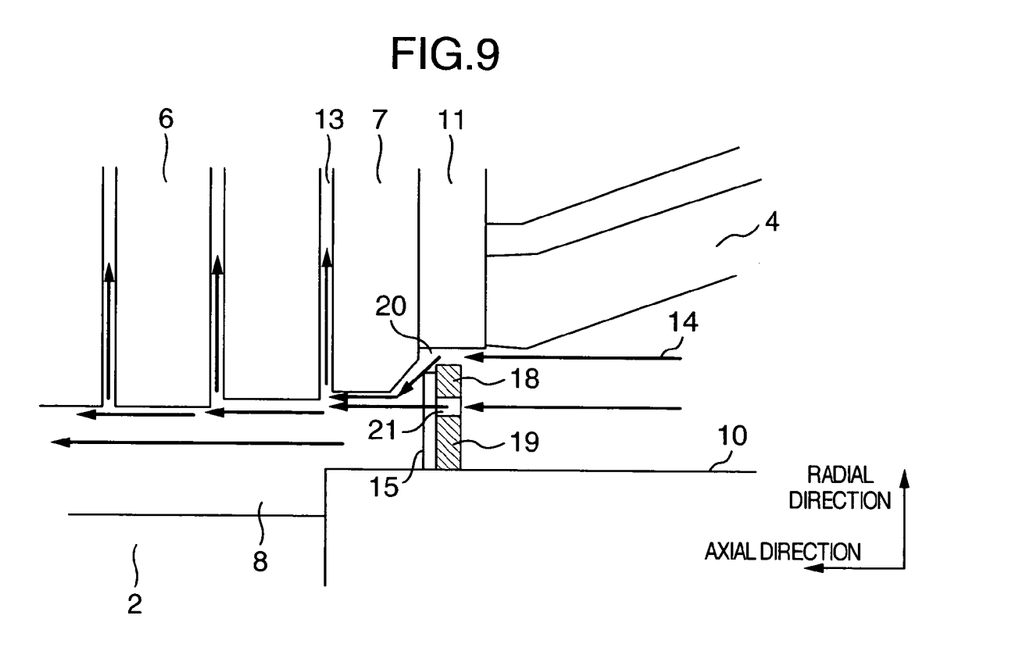
FIG. 9 is an enlarged view of a cross section in an axial direction and a radial direction near end portions of a stator and a rotor in accordance with an embodiment 2 of the present invention.
Figure 10:
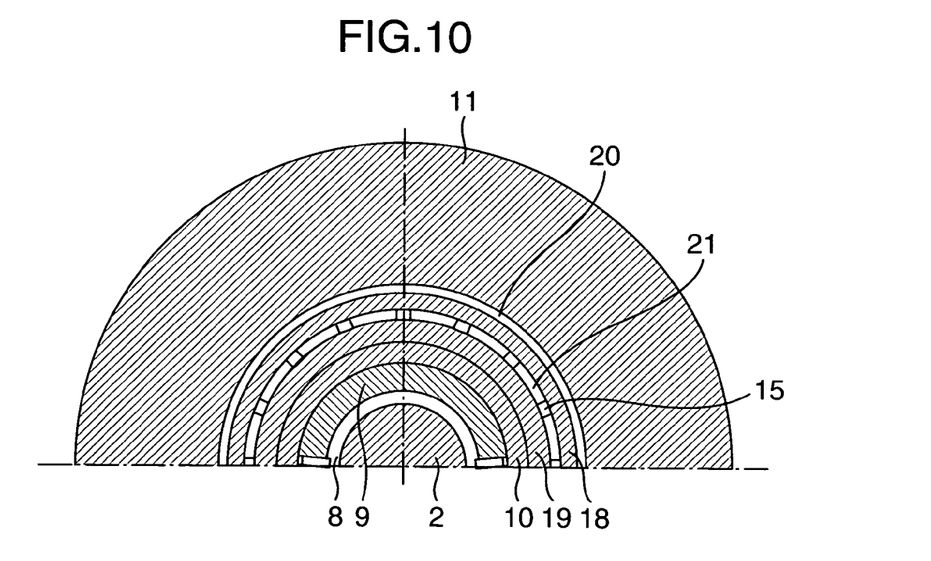
FIG. 10 is a cross sectional view in a circumferential direction and a radial direction near the end portions of the stator and the rotor in accordance with the embodiment 2 of the present invention.

FIG. 9 is an enlarged view of a cross section in an axial direction and a radial direction near the end portions of the stator and the rotor, showing an embodiment 2 in accordance with the present invention, and FIG. 10 is a cross sectional view in a circumferential direction and a radial direction in the structure shown in FIG. 9.

A baffle plate in accordance with the present embodiment is formed by two concentric plates in the same manner as that of the embodiment 1, the baffle plate 19 is fixed to the holding ring 10, and is divided in a circumferential direction by the baffle plate supporting member 15 corresponding to a member in a radial direction which is connected to the baffle plate 19, and the baffle plate 18 is held in a space between the stator iron core 6 and the rotor iron core 5 or the holding ring 10 by the baffle plate supporting member 15. Since the gap 20 is provided between the inner periphery of the stator iron core pressing member 11 and/or the inner periphery of the stator iron core end portion 7, and the baffle plate 18, the gap 21 is provided between the baffle plate 18 and the baffle plate 19, and the gap 21 is positioned close to the center in the radial direction rather than the inner diameter of the stator iron core 6, the same cooling effect as that of the embodiment 1 can be achieved.

Embodiment 3

Figure 11:
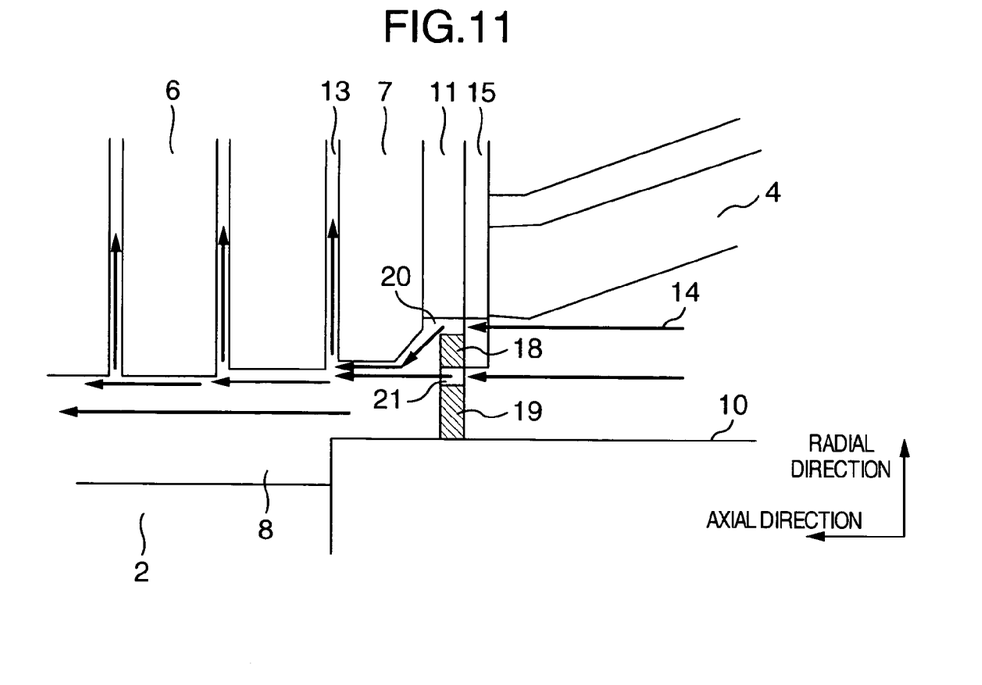
FIG. 11 is an enlarged view of a cross section in an axial direction and a radial direction near end portions of a stator and a rotor in accordance with an embodiment 3 of the present invention.

FIG. 11 is an enlarged view of a cross section in an axial direction and a radial direction near the end portions of the stator and the rotor, showing an embodiment 3 in accordance with the present invention, and FIG. 10 is a cross sectional view in a circumferential direction and a radial direction in the structure shown in FIG. 11.

Figure 12:
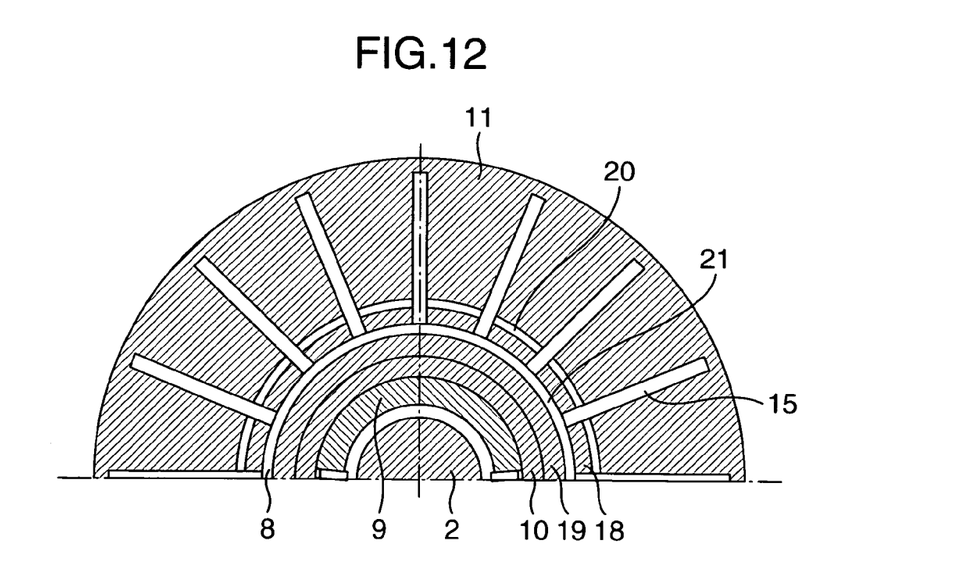
FIG. 12 is a cross sectional view in a circumferential direction and a radial direction near the end portions of the stator and the rotor in accordance with the embodiment 3 of the present invention.

A baffle plate in accordance with the present embodiment is formed by two concentric plates in the same manner as that of the embodiments 1 and 2, the baffle plate 19 is fixed to the holding ring 10, and the baffle plate 18 is mounted to the baffle plate supporting member 15, and is supported to the stator iron core end portion 7 or the stator iron core pressing member 11. Since the gap 20 is provided between the inner periphery of the stator iron core pressing member 11 and/or the inner periphery of the stator iron core end portion 7, and the baffle plate 18, the gap 21 is provided between the baffle plate 18 and the baffle plate 19, and the gap 21 is positioned close to the center in the radial direction rather than the inner diameter of the stator iron core 6, the same cooling effect as that of the embodiments 1 and 2 can be achieved.

Embodiment 4

Figure 13:
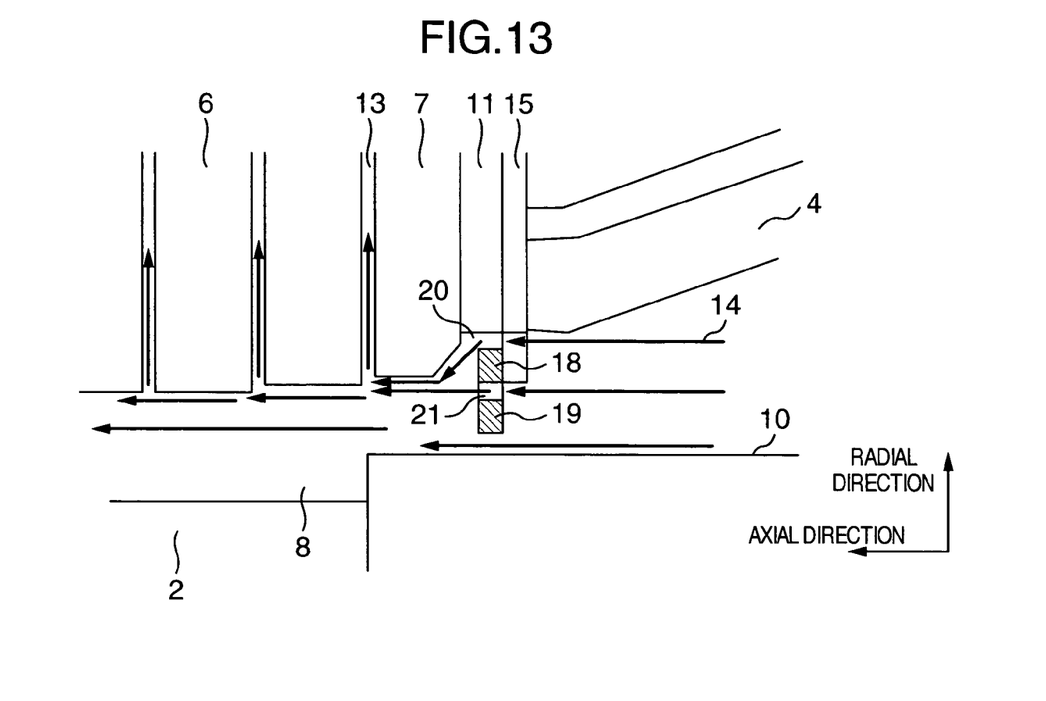
FIG. 13 is an enlarged view of a cross section in an axial direction and a radial direction near end portions of a stator and a rotor in accordance with an embodiment 4 of the present invention.
Figure 14:
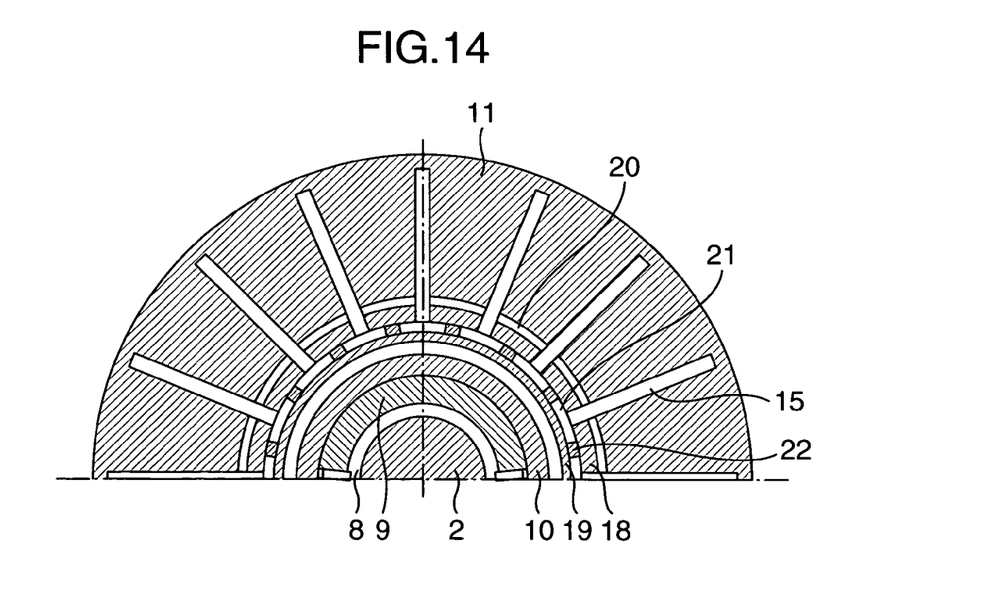
FIG. 14 is a cross sectional view in a circumferential direction and a radial direction near the end portions of the stator and the rotor in accordance with the embodiment 4 of the present invention.

FIG. 13 is an enlarged view of a cross section in an axial direction and a radial direction near the end portions of the stator and the rotor, showing an embodiment 4 in accordance with the present invention, and FIG. 14 is a cross sectional view in a circumferential direction and a radial direction in the structure shown in FIG. 13.

A baffle plate in accordance with the present embodiment is formed by two concentric plates in the same manner as that of the embodiments 1, 2 and 3, the baffle plate 18 is mounted to the baffle plate supporting member 15, and is supported to the stator iron core end portion 7 or the stator iron core pressing member 11. The baffle plate 19 is supported by a member in a radial direction which is constituted by an integral member with the baffle plate 18 or an independent member from the baffle plate 18, such that the gap 21 provided between the baffle plate 18 and the baffle plate 19 is divided in the peripheral direction. Since the gap 20 is provided between the inner periphery of the stator iron core pressing member 11 and/or the inner periphery of the stator iron core end portion 7, and the baffle plate 18, the gap 21 is provided between the baffle plate 18 and the baffle plate 19, and the gap 21 is positioned close to the center in the radial direction rather than the inner diameter of the stator iron core 6, the same cooling effect as that of the embodiments 1, 2 and 3 can be achieved.

In this case, the baffle plate in accordance with the embodiments 1 to 4 of the present invention is constituted by two concentric plates, however, may be constituted by three or more concentric plates. Of course, the gap between the plates in this case is positioned close to the center in the radial direction rather than the inner diameter of the stator iron core 6.

Further, the baffle plate in accordance with the embodiments 1 to 4 of the present invention is constituted by two concentric plates, however, can be structured by separating the baffle plate into a plurality of pieces in a circumferential direction and connecting the separated baffle plates directly or via a connecting member, while taking into consideration a convenience in assembling or executing a dynamo-electric machine, without being limited to the ring-like integral structure.

Further, the baffle plate in accordance with the embodiments 1 to 4 of the present invention is constituted by two concentric plates, however, can be structured by a plate which fills the gap between the baffle plates 18 and the baffle plate 19 in FIG. 1, and is provided with an opening portion formed by piercing a through hole corresponding to the gap between the baffle plates 18 and 19. Of course, the opening portion in this case is positioned close to the center in the radial direction rather than the inner diameter of the stator iron core 6.

Embodiment 5

Figure 15:
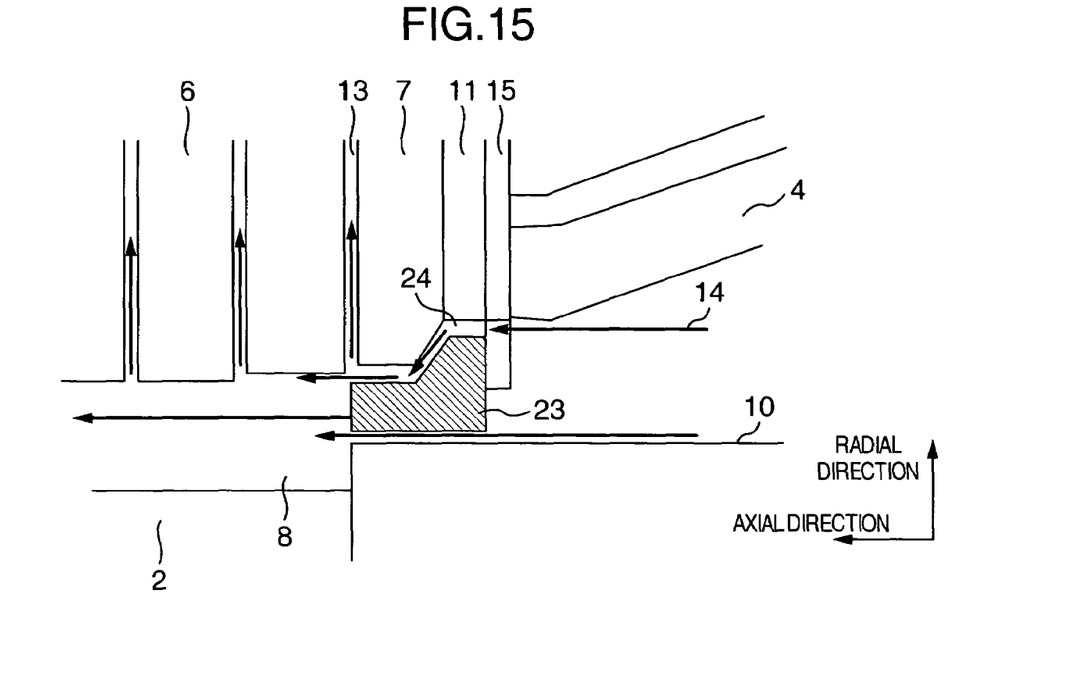
FIG. 15 is an enlarged view of a cross section in an axial direction and a radial direction near end portions of a stator and a rotor in accordance with an embodiment 5 of the present invention.
Figure 16:
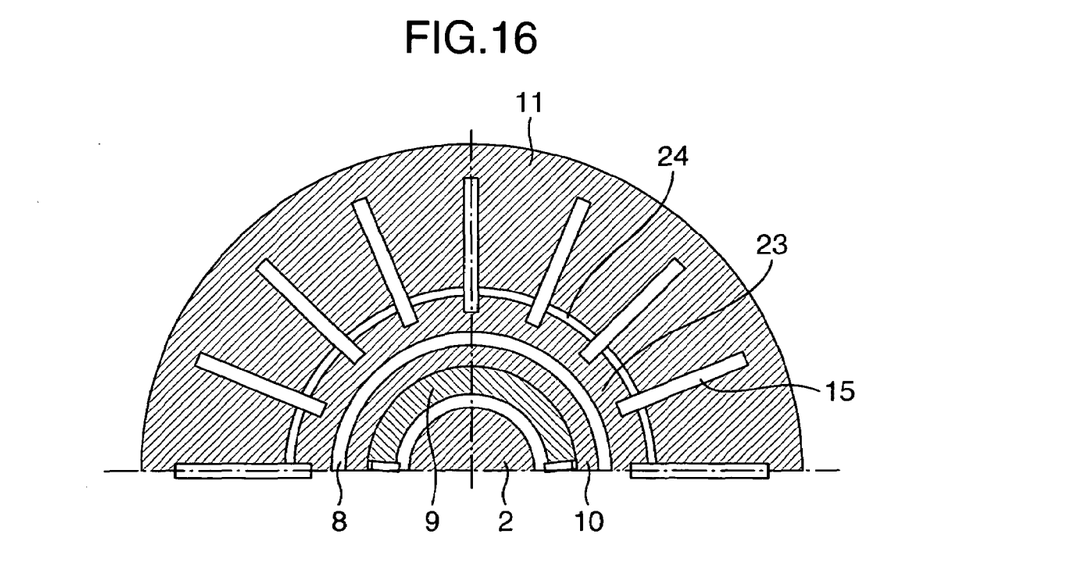
FIG. 16 is a cross sectional view in a circumferential direction and a radial direction near the end portions of the stator and the rotor in accordance with the embodiment 5 of the present invention.

FIG. 15 is a cross sectional view in an axial direction and a radial direction near the end portions of the stator and the rotor, showing an embodiment 5 in accordance with the present invention, and FIG. 16 is a cross sectional view in a circumferential direction and a radial direction in the structure shown in FIG. 15.

In the present embodiment, a baffle plate being astride both of the stator iron core end portion 7 and the stator iron core pressing member 11 is provided in the inner peripheral sides of the stator iron core end portion 7 and the stator iron core pressing ember 11, the baffle plate 23 extends in an axial direction along the inner peripheral sides of the stator iron core end portion 7 and the stator iron core pressing member 11, a gap 24 is provided between the inner periphery of the stator iron core end portion 7 and the baffle plate 23, an outer peripheral shape of the baffle plate 23 is formed in a shape approximately along the inner peripheral shape of the stator iron core end portion 7 and/or the stator iron core pressing member 11, and the baffle plate 23 is fixed together with the stator iron core pressing member 11 by the baffle plate supporting member 15 such that an interval of the gap 24 is approximately uniform in a flowing direction of the cooling medium.

In accordance with the present embodiment, since the cooling medium 14 flowing into the gap 24 between the stator iron core end portion 7 and/or the inner periphery of the stator iron core pressing member 11 and the baffle plate 23 flows within the flow path between the axially expanded baffle plate 23 and the stator iron core end portion 7 and/or the stator iron core pressing member 11 without diffusing, it is possible to effectively cool the stator iron core end portion 7, and the same cooling effect as that of the embodiment 1, 2, 3 and 4 can be achieved.

In this case, the baffle plate in accordance with the embodiment 5 of the present invention is constituted by one plate, however, can be structured by separating the baffle plate into a plurality of pieces in a circumferential direction and connecting the separated baffle plates directly or via a connecting member, while taking into consideration a convenience in assembling or executing a dynamo-electric machine, without being limited to the ring-like integral structure.

Further, the baffle plate in accordance with the embodiments 1 to 5 of the present invention is fixed to the stator iron core pressing member 11 or the holding ring 10, however, can be fixed to the stator iron core end portion 7.

It should be further understood by those skilled in the art that the foregoing description has been made on embodiments of the invention and that various changes and modifications may be made in the invention without departing from the spirit of the invention and the scope of the appended claims.

The invention claimed is:

1. A dynamo-electric machine comprising:
   a stator constituted by a stator iron core, a stator iron core pressing member for pressing said stator iron core, and a stator coil wound around said stator iron core;
   a rotor constituted by a rotor iron core inserted to an inner periphery of said stator via a gap, a rotor coil inserted to a plurality of slots provided in said rotor iron core, and a holding ring covering an outer periphery of a rotor coil end portion protruding from said rotor iron core end portion; and
   a baffle plate arranged in an inner diameter side of said stator iron core end portion and distributing a cooling medium cooling an inner side of the machine,
   wherein said baffle plate is a plurality of concentric plates laminated in a diametric pattern, a gap flowing the cooling medium is provided in an axial direction between an outermost peripheral plate of said baffle plate and an inner periphery of said stator iron core pressing member and/or between said baffle plate and an inner periphery of said stator iron core end portion, an axially-penetrating opening portion generating a cooling medium flow which is combined with the cooling medium flowing through said gap and generates a flow along the inner periphery of said stator iron core pressing member and/or the inner periphery of said stator iron core end portion is formed between the plurality of plates constituting said baffle plate, and the opening portion is positioned close to a center in a diametrical direction rather than the inner peripheral surface of said stator iron core of said baffle plate.

2. A dynamo-electric machine as claimed in claim 1, wherein said baffle plate is held in a space between said stator iron core and said rotor iron core or in a space between said stator iron core and said holding ring, by a supporting member placed in a side of said stator iron core.

3. A dynamo-electric machine as claimed in claim 1, wherein said baffle plate is fixed to a side of said holding ring or said rotor iron core, and is held in a space between said stator iron core and said rotor iron core or in a space between said stator iron core and said holding ring.

4. A dynamo-electric machine as claimed in claim 1, wherein said baffle plate is constituted by two concentric plates laminated in the diametrical pattern, and said baffle plate positioned in said stator iron core side is supported by a supporting member fixed to said stator iron core side, and said baffle plate positioned in said rotor iron core side is fixed to said holding ring.

5. A dynamo-electric machine as claimed in claim 1, wherein said baffle plate is separated into a plurality of pieces in a peripheral direction, and the separated baffle plates are connected to each other directly or via a connecting member.

* * * * *